United States Patent [19]

Kodera

[11] Patent Number: 4,482,264
[45] Date of Patent: Nov. 13, 1984

[54] UNIVERSAL JOINT FOR FISHING LINES
[75] Inventor: Yasuji Kodera, Nigata, Japan
[73] Assignee: Kabushiki-Kaisha Kodera Seisakusho, Sanjo, Japan
[21] Appl. No.: 482,683
[22] Filed: Apr. 6, 1983
[30] Foreign Application Priority Data
  Apr. 30, 1982 [JP] Japan ............................. 57-63717[U]
  Aug. 9, 1982 [JP] Japan ............................. 57-120901[U]
[51] Int. Cl.³ .............................................. F16D 3/00
[52] U.S. Cl. ..................................... 403/58; 403/165; 59/95
[58] Field of Search .................. 403/164, 165, 78, 154, 403/152, 58; 59/95, 86

[56] References Cited
U.S. PATENT DOCUMENTS 99,623  2/1870 Bangs ................................. 59/86 X
2,387,599 10/1945 Miller et al. ......................... 403/165
2,438,548  3/1948 Ehmann ............................. 403/78 X
3,270,494  9/1966 Holmes .................................. 59/86
3,347,110 10/1967 Wilson ............................ 403/362 X Primary Examiner—Andrew V. Kundrat
Attorney, Agent, or Firm—Jordan and Hamburg

[57] ABSTRACT

A universal joint for connecting ropes for use in fishing. Two U-rods connect two ropes together. The two U-rods are supported by a spindle so as to be rotatable relative to each other. At least one of the two U-rods is supported oscillatably by the spindle via a pin mounted detachably in a direction usually perpendicular to the axis of rotation of the spindle. When the connected two adjacent ropes are about to be twisted relative to each other, the two U-rods make relative rotation, absorbing possible twists. When the connected rope is bent, the U-rod swings to prevent the occurrence of excessive stress ascribable to the bend. The spindle or pin is provided with a retaining means for preventing the pin from slipping off.

6 Claims, 7 Drawing Figures

UNIVERSAL JOINT FOR FISHING LINES

BACKGROUND OF THE INVENTION

This invention relates to an improvement of a universal joint (swivel) for fishing ropes.

Usually, lines are used to set a fishing net in a predetermined fishing zone and to recover it by a trawler. The lines are affected greatly by movement of the fishing net, the wave action, and so forth. These actions twist the lines severely, decreasing their durability.

Generally in order to avoid these problems, a universal joint, called a swivel, is inserted into a connection point between two adjacent lines to allow free motion of the line.

A conventional swivel comprises a U-shaped fork and a ring of a closed-loop form coupled to each other at the base of the fork. The fork and the ring can make relative rotation about the spindle of the swivel located along the direction in which the lines are pulled. Such fork has two arms adapted to retain a pin which is screwed into holes formed in their ends. The pin so fitted in bridges in both arms of the fork.

A C-shaped hook or a shackle is mounted on an end of one of two lines to be connected together. A loop for having such pin passed therethrough is formed in an end of the other line, the loop being produced by bending the end portion.

The C-shaped shackle is connected to the ring of the swivel, while the loop is connected to the fork of the swivel, via the pin.

When the two lines thus connected together by the swivel begin to twist relative to each other, the ring and fork of the swivel rotate relative to one another and absorb the twist, thus avoiding damage to the lines due to the twist.

The two connected adjacent lines are, however, affected by bends as well as twists. Since the swivel is unable to absorb the bends, the bent lines undergo rubbing or deformation at the junction between the line and the ring or fork. Thus, the line under bending action tends to be damaged.

Particularly, the loop of the line can be easily damaged because it is rubbed at a sharp-angled portion formed by the intersection of the pin and the fork arm. Also, rubbing occurring between the pin and the loop may loosen the pin screwed into the holes of the arms, thereby causing it to slip off the fork.

SUMMARY OF THE INVENTION

The universal joint according to this invention comprises two U-shaped rods to be connected with two adjacent lines, and a spindle which supports the two U-shaped rods rotatably relative to each other. At least one of the two U-shaped rods has an open end into which one of the shaft portions of the spindle is inserted. A pin is mounted to bridge both legs of the at least one U-shaped rod in such a manner as to intersect the axis of rotation of the shaft portion of the spindle. The at least one U-shaped rod is supported by the spindle via the pin and swings about the pin.

The universal joint in this invention is also provided with a retaining means for preventing the pin from slipping off. The retaining means can be provided in either the pin or the spindle.

According to this invention, when two adjacent lines connected with the two U-shaped rods begin to be twisted, the spindle absorbs the twist. In case a bending action is exerted on the line, the U-shaped rod sways relative to the spindle, absorbing the bend. The line is connected to the curved portion of the U-shaped rod, thus avoiding possible strong rubbing of the rope at a portion connected to the U-shaped rod.

The present invention also involves the aforementioned retaining means to prevent the pin from slipping off from the spindle and the U-shaped rod.

An object of this invention is to increase the degree of freedom of the junction between two adjacent lines, absorbing the force to be exerted on the lines in an undesirable direction.

Another object of the invention is to reduce abrasion at the portion where the line is connected with the joint.

A further object of the present invention is to prevent the pin of the joint from slipping off, thereby enhancing the reliability and safety of the joint.

EMBODIMENTS OF THE INVENTION

Figure 1:
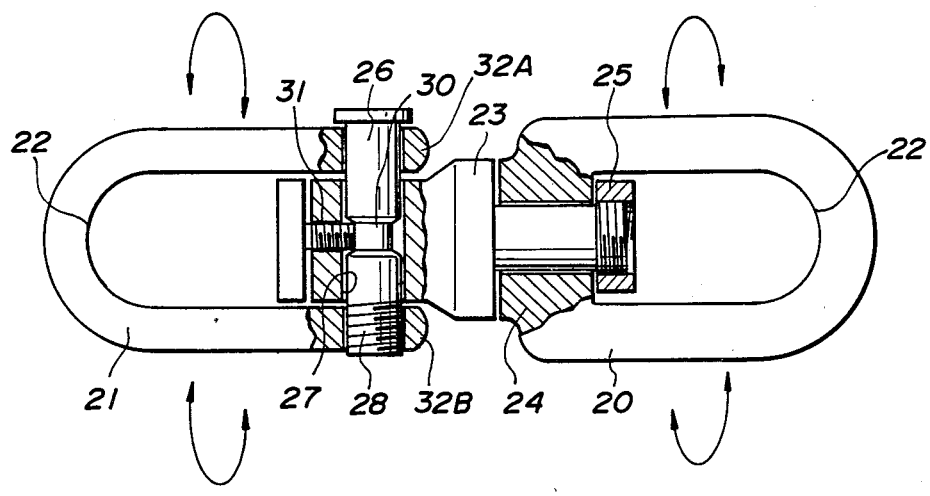
FIG. 1 is an elevational view (partly in section) of a universal joint constituting the first embodiment of this invention.
Figure 2:
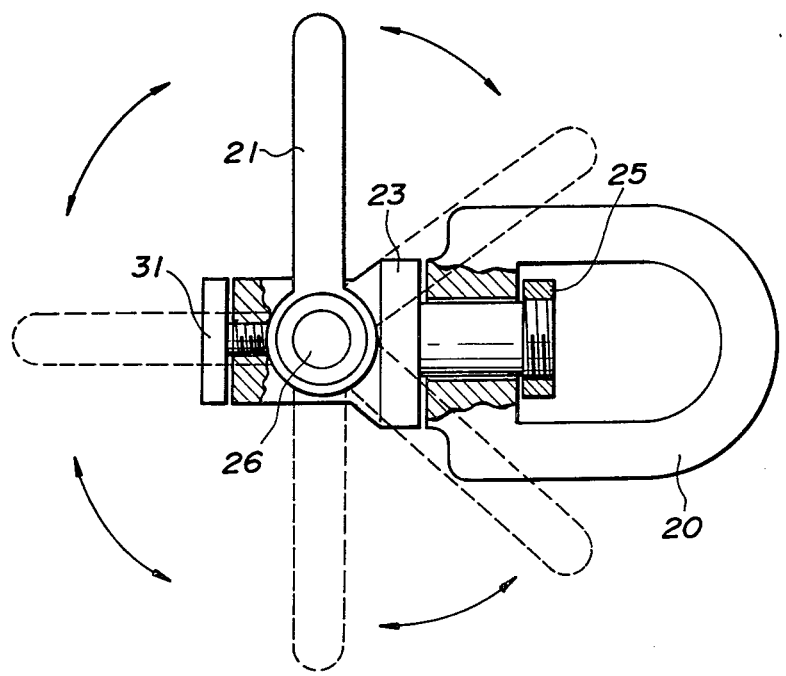
FIG. 2 is a partly sectional plan view of a universal joint according to the first embodiment of this invention.

In the first embodiment of this invention as illustrated in FIGS. 1 and 2, two U-shaped rods 20 and 21 are connected together rotatably about their longitudinal center lines via a spindle 23 with their curved portions 22 facing the outside. One of the U-shaped rods, indicated at 20, is of a closed loop type. Into its support arm 24 is rotatably inserted the spindle 23. The inserted end of the spindle 23 is held by a nut 25 and secured thereto by welding or the like.

The other U-rod 21 is of an open type, and is connected detachably to the spindle 23 via a pin 26 which is passed through both legs 32A, 32B of the U-shaped rod 21 to bridge these legs. The pin 26 is inserted into the legs through a tubular hole 27 that passes through the spindle 23. The pin 26 is secured to the leg 32B on its threaded portion 28.

On the circumferential portion of the center of the pin 26 is formed an engagement groove 30. The front end of a set-screw 31 enters into this engagement groove 30 in such a manner as not to contact the wall of the engagement groove 30. The set-screw 31 is inserted into a tapped portion of an end of the spindle 23 toward the engagement groove 30.

When two adjacent lines (not shown) are connected with the U-shaped rods 20 and 21, the ropes are not twisted because the U-shaped rods 20 and 21 are rotatable about the axis of each line. Moreover, the U-shaped rod 21 swings about the pin 26. Therefore, if a bending force works on the line, the U-shaped rod 21 rocks to keep off excessive stress acting on the line.

Furthermore, the pin 26 is screwed into the U-shaped rod 21 at its threaded portion 28, and the set-screw 31 working as a retaining means is fitted into the cavity defined by the engagement groove 30. Thus, various forces, if exerted, never loosen the pin 26, thereby making it possible to maintain a firm connection of lines and provide increased safety.

In addition, the line is applied to the curved portion 22 of the U-shaped rod 20 or 21. This avoids wear of the line, and provides increased service life of the line.

Figure 3:
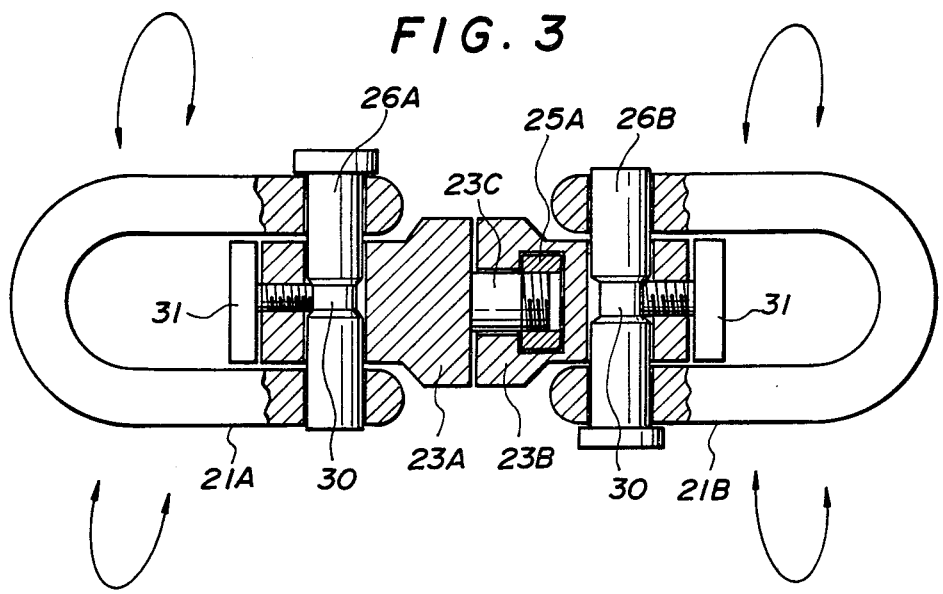
FIG. 3 is a partly sectional front view of a universal joint according to the second embodiment of this invention.
Figure 4:
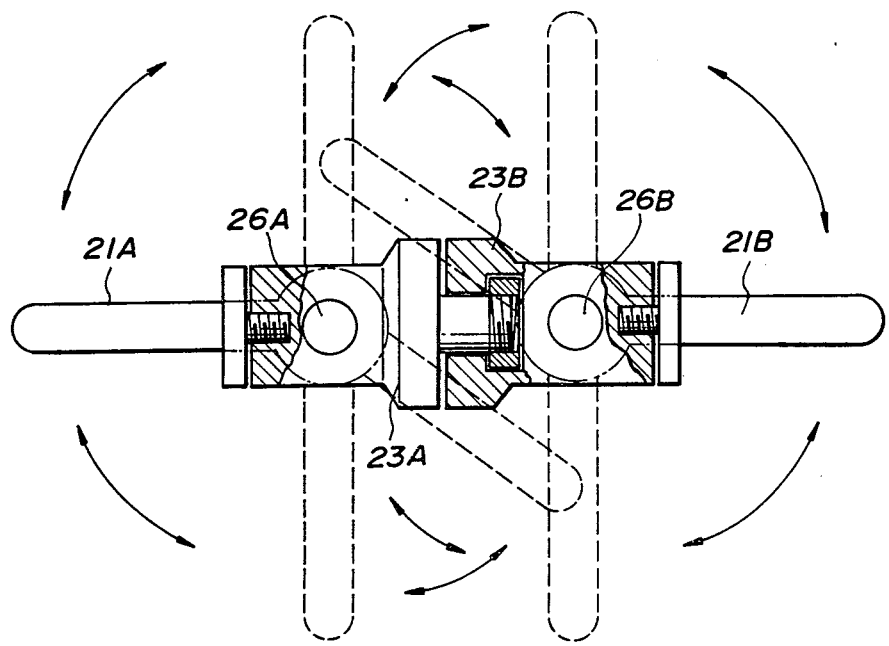
FIG. 4 is a partly sectional plan view of a universal joint according to the second embodiment of this invention.

In the embodiment of FIGS. 3 and 4, U-shaped rods 21A, 21B of an open type are connected together oscillatably via pins 26A, 26B.

A spindle 23 is divided at its center into the two portions, 23A and 23B, which are connected together by means of a shaft 23C and a nut 25A. Retaining means for preventing the pins 26A, 26B from slipping off are of a similar construction to the pin 26 illustrated in FIG. 1 or 2.

The above-described contruction further improves the detachability of the lines, further enhances the degree of freedom in the movement of the U-shaped rods 21A, 21B, and allows the efficient absorption of deforming stress exerted on the lines.

Accordingly, the universal joint shown in this embodiment is suitable for use under more severe conditions, as compared with the universal joint illustrated in FIG. 1 or 2.

Figure 5:
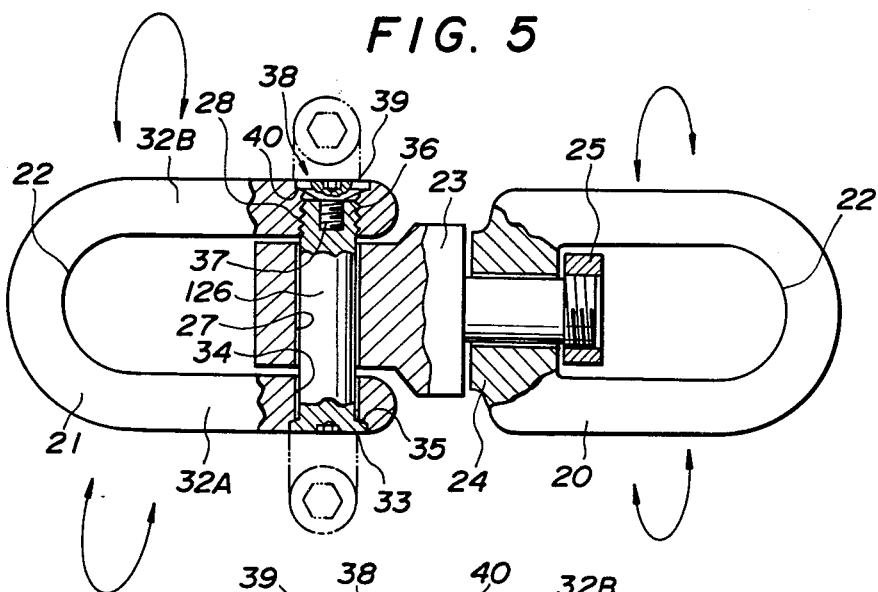
FIG. 5 is a partly sectional front view of a universal joint according to the third embodiment of this invention.

FIG. 5 shows a universal joint according to a third embodiment of the present invention.

The universal joint shown there is similar to that of FIG. 1 in that an open-type U-shaped rod 21 is connected detachably to a spindle 23 via a pin 126 fitted into both legs 32A, 32B of the U-shaped rod 21.

However, the pin 126 has dimensions such that its head 33 is completely embedded in a tubular hole 34 of one of the legs 32A, via a spot facing 35 formed at the outer peripheral end of the tubular hole 34, while a threaded front end 28 of the pin 126 is screwed into a tapped hole 36 of the other leg 32B at not too great a depth; namely, so that some room leading to the outside is left in the tapped hole 36.

Figure 6:
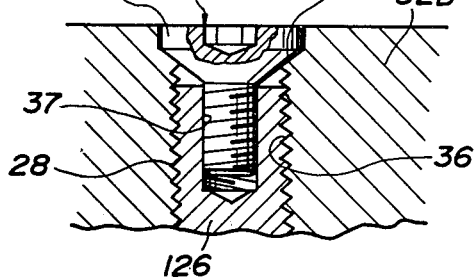
FIG. 6 is an enlarged sectional view of a retaining means for preventing the slipping-off of the pin from the universal joint, illustrated in FIG. 5.

As a retaining means to prevent the pin 126 from falling off, a tapped hole 37 is formed in the shaft portion of the threaded front end 28 of the pin 126, as illustrated in FIG. 6. Into the tapped hole 37, moreover, is screwed a screw member 38 coaxially from the outside such that its head 39 is pressed against the other leg 32B.

The head 39 is pressed against the other leg 32B via a spot facing 40 formed in the outer peripheral end of the tapped hole 36. Also, the head 39 is pushed into the other leg 32B such that the head 39 does not project from the outer surface of the other leg 32B.

The pin 126 and the screw member 38 are threaded in the same direction, and can be set in place, for example, in the rightward direction.

Other constructional aspects of the universal joint illustrated in FIGS. 5 and 6 are similar to those in FIG. 1. A more detailed description of the universal joint will therefore be omitted. The same reference members as used in FIG. 1 are used in FIGS. 5 and 6.

The above-mentioned constructions provide the following advantages:

When two lines (not shown) are connected with U-shaped rods 20, 21, twists of the lines can be avoided, since the U-shaped rods 20 and 21 are rotatable about the axis of the lines. Furthermore, the U-shaped rod 21 sways about the pin 126. If a bending force acts on the line, the U-shaped rod 21 sways and prevents excessive stress from working on the line, as in the case of the first embodiment (FIG. 1).

According to the embodiment of FIGS. 5 and 6, the pin 126 constitutes the so-called screw nut bolt with the screw member 38, whereby the pin 126 is clamped tightly by the U-shaped rod 21. Therefore, it is very unlikely that the pin 126 will loosen and slip off.

If one of the pin 126 and the screw member 38 is about to loosen, the other part acts to be screwed in. Consequently, the pin 126 and the screw member 38 are clamped tightly by each other's screw or tap, and thus do not loosen.

Hence, the lines can be kept connected firmly, thus enhancing safety.

With this embodiment, the heads 33, 39 of the pin 126 and the screw member 38, respectively, are embedded in the spot facings 35 and 40 of the U-shaped rod 21 and never go beyond the outer surface of the U-shaped rod 21. Accordingly, the heads 33 and 39 do not hamper fishing operations or damage lines which are otherwise caught by the heads 33 and 39. This is another feature which is not present in the first or second embodiment of this invention.

Figure 7:
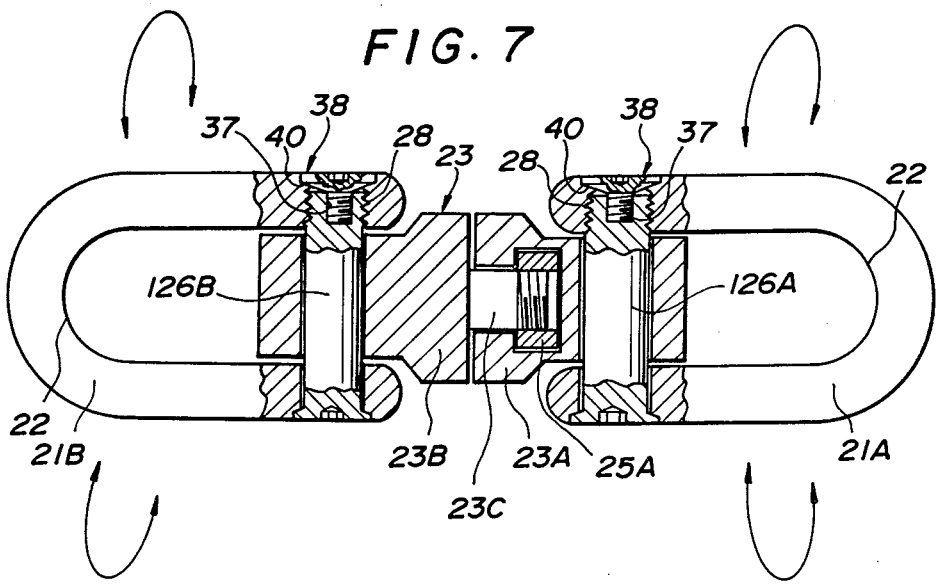
FIG. 7 is a partly sectional front view of a universal joint according to the fourth embodiment of this invention.

FIG. 7 reveals the fourth embodiment of the present invention.

The universal joint of this embodiment uses U-shaped rods 21A, 21B of an open type. These U-shaped rods 21A, 21B are oscillatably connected together to a spindle 23 via pins 126A, 126B. The spindle 23 is split at its center into two portions 23A and 23B which are connected together rotatably relative to each other. This arrangement affords an increased degree of freedom in the movement of the U-shaped rods 21A and 21B, and efficiently absorbs deforming stress to be exerted on the lines. This is a difference from the third embodiment of the present invention.

The universal joint of the above-mentioned embodiment is characterized in that it is more suitable for use under more harsh conditions than for the third embodiment, as is clear from the relationship between the first embodiment and the second embodiment.

What is claimed is:

1. A universal joint for fishing lines, comprising two U-shaped rods to be connected with two adjacent lines, a spindle for supporting said two U-shaped rods rotatably relative to each other, a pin for supporting one of said U-shaped rods oscillatably relative to said spindle, said pin passing through both legs of said one U-shaped rod to bridge said legs perpendicularly to the axis of rotation of said spindle, and a retaining means for preventing said pin from slipping off of said spindle and said one U-shaped rod, said retaining means comprising an engagement groove formed in the circumference of the center of said pin and a set-screw screwed into an end of said spindle such that its front end enters the cavity defined by said engagement groove but keeps out of contact from the wall of said engagement groove.

2. A universal joint for fishing lines, comprising two U-shaped rods to be connected with two adjacent lines, a spindle for supporting said two U-shaped rods rotatably relative to each other, a pin for supporting one of said U-shaped rods oscillatably relative to said spindle, said pin passing through both legs of said one U-shaped rod to bridge said legs perpendicularly to the axis of rotation of said spindle, and a retaining means for preventing said pin from slipping off of said spindle and said one U-shaped rod, said retaining means comprising a threaded portion formed in the front end of said pin and screwed into a tapped hole of one of the legs of the U-shaped rod and a screw member screwed into a tapped hole formed in said threaded front end portion of said pin, the head portions of said pin and said screw member being pressed against the corresponding legs of the U-shaped rod in such a manner as not to go beyond the outer surfaces of the corresponding legs of the U-shaped rod.

3. A universal joint according to claim 2, wherein said screw member has a thread cut in the same direction as the thread of the threaded front end of said pin.

4. A universal joint for fishing lines, comprising two U-shaped rods to be connected with two adjacent lines, a spindle for supporting said two U-shaped rods rotatably relative to each other, two pins for supporting said two U-shaped rods oscillatably relative to said spindle, said two pins passing through both legs of the corresponding U-shaped rods to bridge said legs perpendicularly to the axis of rotation of said spindle, and two retaining means for preventing said two pins from slipping off of said spindle and said corresponding U-shaped rods, said retaining means each comprising an engagement groove formed in the circumference of the center of the respective pin and a set-screw screwed into the ends of said spindle such that its front end enters the cavity defined by the respective engagement groove but keeps out of contact from the wall of the respective engagement groove.

5. A universal joint for fishing lines, comprising two U-shaped rods to be connected with two adjacent lines, a spindle for supporting said two U-shaped rods rotatably relative to each other, two pins for supporting said two U-shaped rods oscillatably relative to said spindle, said two pins passing through both legs of the corresponding U-shaped rods to bridge said legs perpendicularly to the axis of rotation of said spindle, and two retaining means for preventing said two pins from slipping off of said spindle and said corresponding U-shaped rods, said retaining means each comprising a threaded portion formed in the front end of the respective pin and screwed into a tapped hole of one of the legs of the respective U-shaped rod and a screw member screwed into a tapped hold formed in said threaded front end portion of the respective pin, the head portions of said pin and said screw member being pressed against the corresponding legs of the respective U-shaped rod in such a manner as not to go beyond the outer surfaces of the corresponding legs of the respective U-shaped rod.

6. A universal joint according to claim 5, wherein each of said screw members has a thread cut in the same direction as the thread of the threaded front end of the respective pin.

* * * * *